(12) United States Patent
Clark et al.

(10) Patent No.: US 7,971,360 B2
(45) Date of Patent: Jul. 5, 2011

(54) POWERED HAND-HELD METAL CUTTER

(75) Inventors: Mark Clark, Liberty Township, OH (US); Alexander Rozumovich, Loveland, OH (US)

(73) Assignee: Kett Tool Company, Cincinnati, OH (US)

( * ) Notice: Subject to any disclaimer, the term of this patent is extended or adjusted under 35 U.S.C. 154(b) by 422 days.

(21) Appl. No.: 12/114,340

(22) Filed: May 2, 2008

(65) Prior Publication Data

US 2009/0271991 A1 Nov. 5, 2009

(51) Int. Cl.
*B26B 15/00* (2006.01)
*B26B 13/00* (2006.01)
(52) U.S. Cl. .............................. 30/288; 30/249; 30/245
(58) Field of Classification Search .................. 30/228, 30/247, 241, 349, 290, 262, 142, 206, 215, 30/223, 225, 232, 249, 252, 253, 245; 74/55, 74/135; D8/70, 57, 61–69, 98
See application file for complete search history.

(56) References Cited

U.S. PATENT DOCUMENTS

| | | | | |
|---|---|---|---|---|
| 2,090,228 A * | 8/1937 | Porter et al. | ..................... | 30/252 |
| 2,567,129 A * | 9/1951 | Shoffner | ......................... | 30/241 |
| 2,635,335 A | 4/1953 | James | | |
| 2,818,643 A * | 1/1958 | Dawson | ......................... | 30/228 |
| 3,740,846 A * | 6/1973 | Duffy | .............................. | 30/267 |
| 4,173,069 A | 11/1979 | Sidenstick et al. | | |
| 4,682,416 A | 7/1987 | Stolfa | | |
| 4,967,475 A * | 11/1990 | O'Keeffe et al. | ............... | 30/252 |
| 6,658,967 B2 * | 12/2003 | Rutkowski et al. | .......... | 76/106.5 |
| D512,623 S * | 12/2005 | Huang | .............. | D8/70 |
| 7,093,365 B2 | 8/2006 | Peterson | | |
| 7,637,016 B2 * | 12/2009 | Fladgard et al. | ................ | 30/134 |

* cited by examiner

*Primary Examiner* — Ghassem Alie
(74) *Attorney, Agent, or Firm* — Wood, Herron & Evans, LLP (57) ABSTRACT

A power driven portable sheet metal cutter includes a head with two blades that mounts to a hand-held electric or pneumatic rotating power unit. The fixed blade has a primary shearing surface that has a convex or radiused cutting edge, a convex or radiused bevel, and a convex or radiused body feature. There is also a clearance radius and a nose radius so that the cutter can cut a wide variety of shapes and configurations of corrugated building panels. A head with a right hand set of blades predominately cuts curves to the right, and a head with a left hand set predominately cuts curves to the left.

14 Claims, 10 Drawing Sheets

POWERED HAND-HELD METAL CUTTER

FIELD OF THE INVENTION

The present invention relates to powered hand held shears for cutting sheet metal and corrugated building panels used in construction.

BACKGROUND OF THE INVENTION

The construction industry uses sheet metal in various ways. For example, sheet metal is used in ductwork, and as the exterior panels and roofing material of commercial buildings. As the speed of building increased, faster tools for quickly cutting the material were needed. There are several ways of cutting metal corrugated panels: with hand snips, power nibblers and power shears. On massive construction sites professionals use stationary industrial machines with blades designed to cut unique profiles.

Using circular saws is undesirable because they leave a cut edge without any treatments such as paint, zinc coating, or galvanizing. Shears, on the other hand, have a natural "edge sealing" effect, smearing the coating or treatment over the freshly cut edge. Shearing may be done with muscle power, as with tin-snips, or by an electrically or pneumatically powered tool that works similarly, but has greater power and speed.

Examples of portable powered shears to cut sheet metal are found in U.S. Pat. No. 2,635,335 to James, U.S. Pat. No. 4,173,069 to Sidenstick et al., U.S. Pat. No. 4,682,416 to Stolfa, and U.S. Pat. No. 7,093,365 to Peterson. U.S. Pat. No. 4,173,069 was assigned to Kett Tool Company, the assignee of the current application.

U.S. Pat. No. 4,173,069 discloses a single moving blade, having two shear surfaces, working in cooperation with a fixed blade on either side, each of which has one shearing surface. U.S. Pat. Nos. 2,635,335, 4,682,416, and 7,093,365, on the other hand, use only one movable blade and one fixed blade.

Each of these devices can cut materials of various thicknesses with some level of success. Cutting flat sheet metal of low thickness (higher gauge numbers) is the easiest. However, the building industry continues to expand their use of metal corrugated panels. Corrugated panels are now more complex than early versions that had only rolling corrugations similar to the pattern found in common corrugated cardboard. Current corrugations are engineered in a variety of depths, shapes, and patterns. The pitch (spacing) between corrugations may be small or large. When viewed in cross-section, the corrugations may be trapezoidal, with sharp angles and deep valleys. Testing of portable shearing devices on the market reveals that they cannot cut all of the corrugated panels available. Therefore, a need exists for an improved tool, having the geometry and materials necessary to smoothly cut a greater variety of corrugated panels. Such a tool should be easy to use to make curved cuts, and ergonomically comfortable. Preferably the tool would bend the cut metal in a way that does not obstruct the tool, the user's hands, or the user's view of the cut.

SUMMARY OF THE INVENTION

To achieve the foregoing objectives, and in accordance with the purposes of the invention as embodied and broadly described, herein, a power driven portable head for a sheet metal cutter has a housing and a movable blade pivotally coupled to a fixed blade. The fixed blade has a leg portion attached to the housing, and on the other end of the leg portion is a foot extending laterally away from the plane of the leg portion.

A clearance radius on the foot adjacent the leg portion provides clearance for the blade to maneuver through the material. A primary shearing surface is on the foot adjacent to the clearance radius and displaced laterally away from the plane of the leg portion, on the side opposite the movable blade. The foot has a back surface separated from the primary shearing surface by a thickness. On the back surface is a convex body feature that continues to a convex bevel that intersects the primary shearing surface at a convex edge.

The movable blade is mounted to oscillate about a pivot axis during operation of the head. One end of the movable blade is forked, and arranged to be driven by an eccentric on a portable rotational drive applied to the head. The driving of the fork oscillates the movable blade about the pivot axis. The other end of the movable blade is shaped to pass beneath the foot of the leg portion and to terminate in a secondary shearing surface that co-operates with the primary shearing surface. Both the primary and secondary shearing surfaces are in a plane parallel to the plane of the leg portion, but spaced from it.

BRIEF DESCRIPTION OF THE DRAWINGS

These and other features, aspects, and advantages of the present invention will become better understood with regard to the following description, appended claims and accompanying drawings wherein:

DETAILED DESCRIPTION

Figures 1, 2:
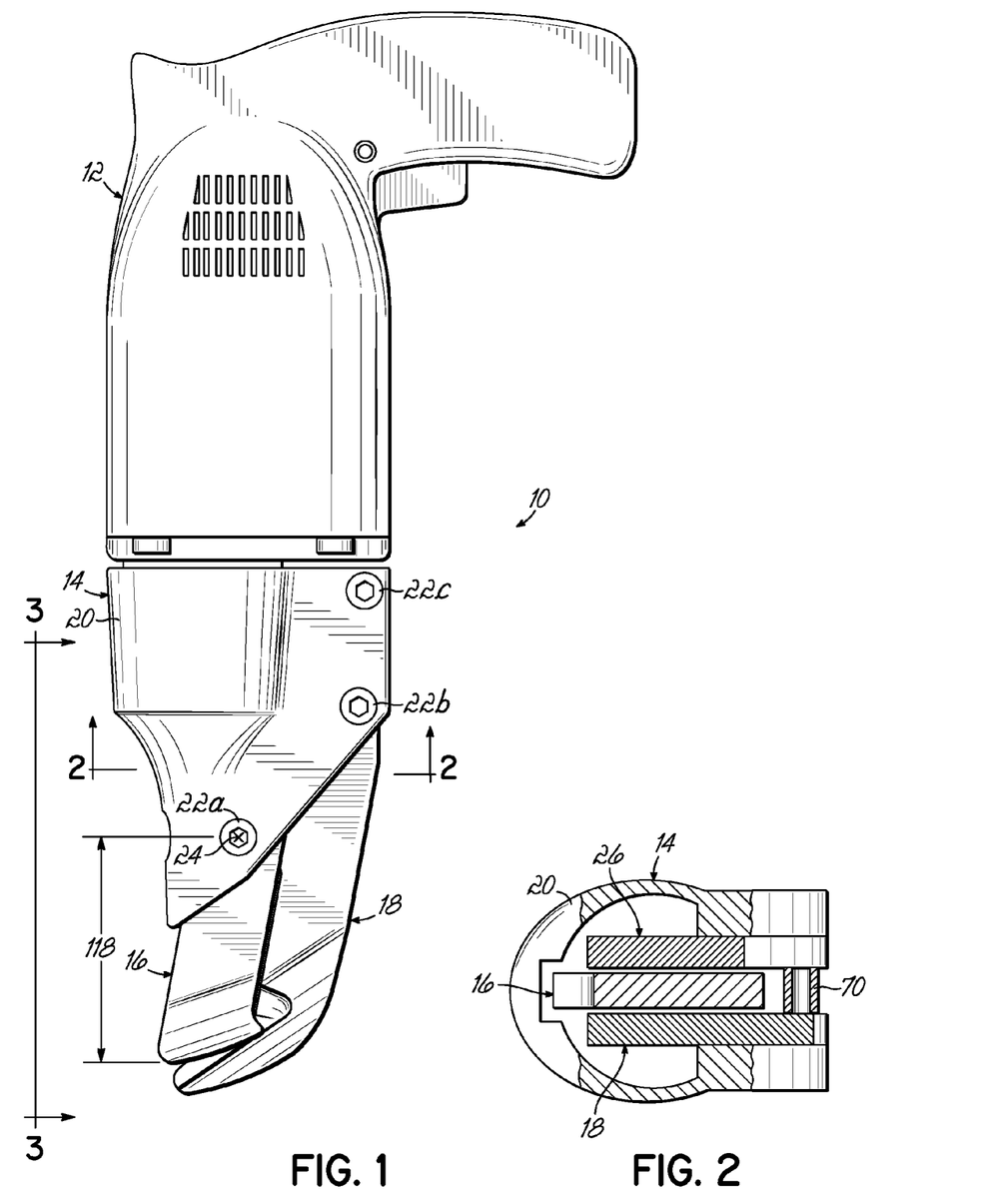
FIG. 1 is an elevational view of a portable power shear of the present invention.
FIG. 2 is a cross-section as indicated in FIG. 1.

With reference to FIG. 1, a portable shear 10 comprises a power unit 12 and a head 14. The power unit may be electric, pneumatic, or driven by another energy source. The head 14 has a movable blade 16 and a fixed blade 18 assembled in a housing 20 with three fasteners 22a, b, c. A pivot axis 24 passes through the movable blade and the fixed blade so that the movable blade can oscillate around the pivot axis relative to the fixed blade. A fixed spacer 26 is on the side of the movable blade 16 opposite from the fixed blade 18. The power unit, housing, pivot axis and method of driving the movable blade are described in other documents, for example, U.S. Pat. No. 4,173,069 for a power shear head issued to Sidenstick and assigned to the same assignee as the current application. U.S. Pat. No. 4,173,069 is hereby incorporated by reference.

Referring to FIGS. 1-4, the housing has a longitudinal slot 28. On one side is a first seat 30 ending in a first shoulder 32, and on the opposite side is a second seat 34 ending in a second shoulder 36. The housing can accept both right hand and left hand versions of the movable and fixed blades, but the right hand and left hand versions must be installed as a set. The fixed spacer 26 can be used with either the right hand set 38 or the left hand set (not shown, as it would simply be a mirror image of 38).

Figure 3:
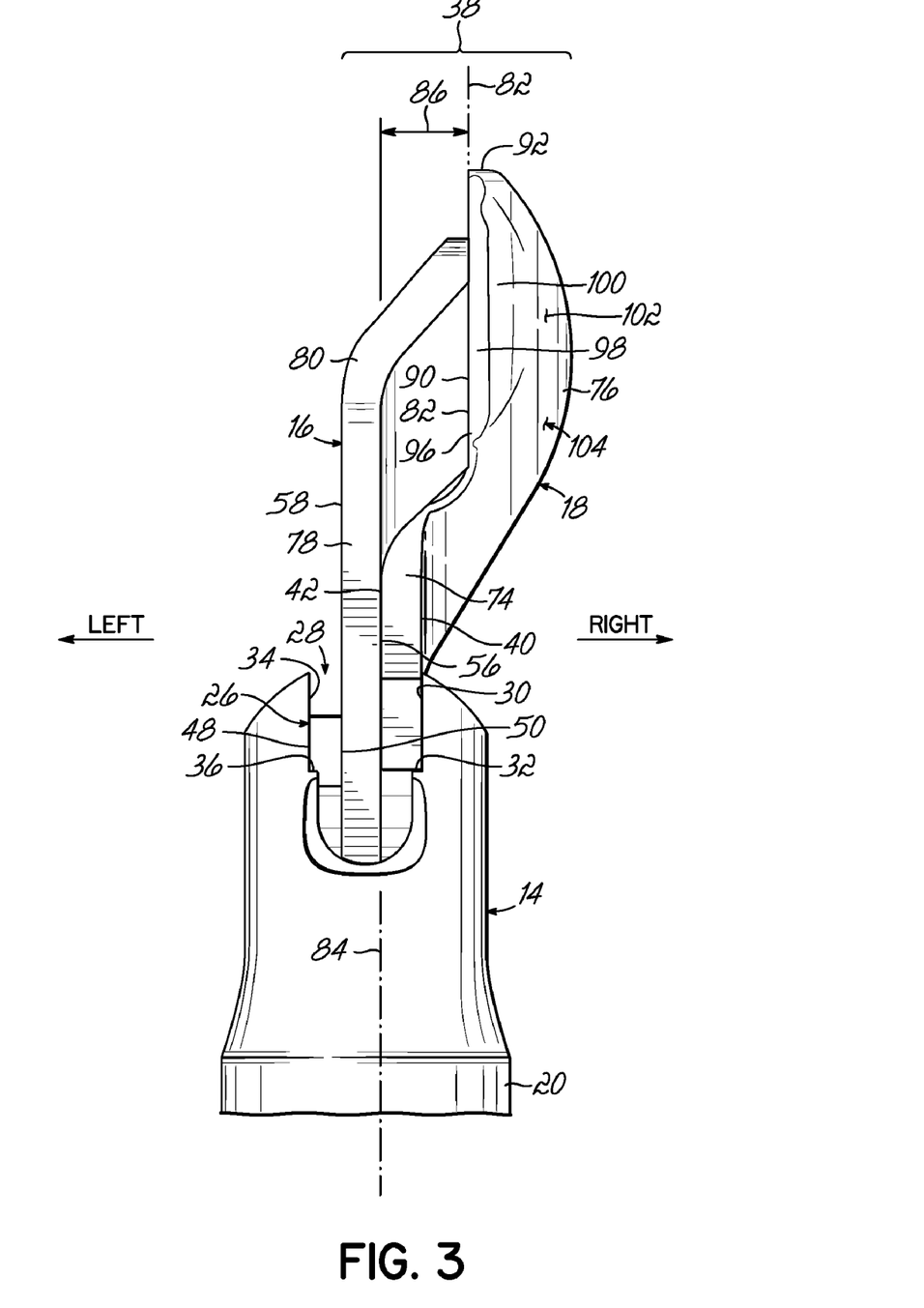
FIG. 3 is a partial top view as indicated in FIG. 1.
Figure 13:
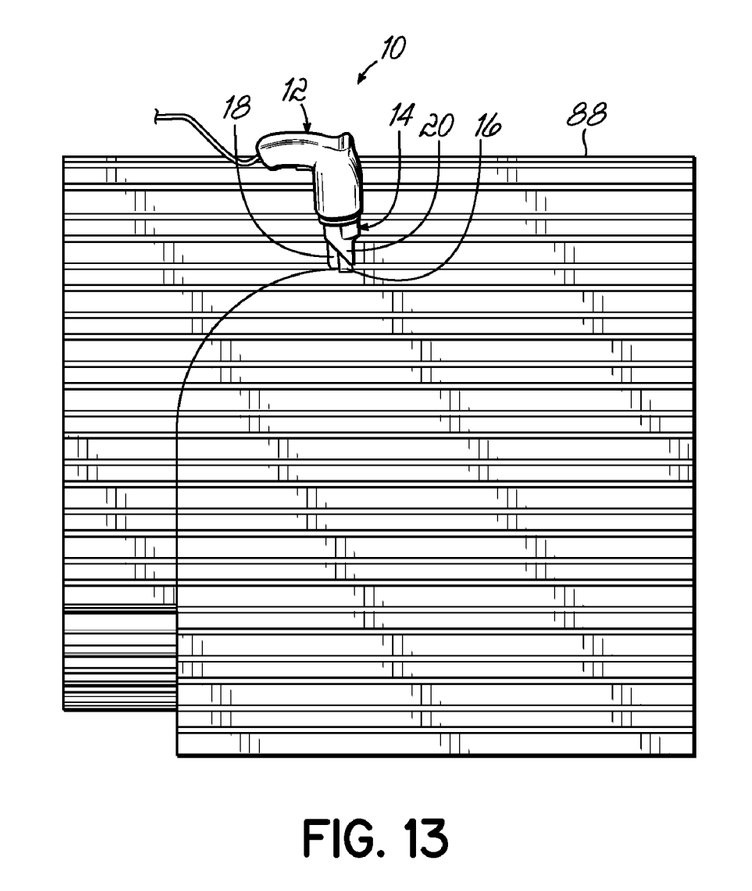

A housing having a right hand set 38 makes a right hand embodiment, as described and illustrated in FIGS. 1-13. The term right-hand refers to a person standing behind and over the portable shear looking down at the view of FIG. 3 and seeing that the fixed blade and the moving blade are on the right-side of the power shear. For the right-hand embodiment the fixed blade 18 mates against the first shoulder 32 and the first seat 30 and a fixed spacer 26 locates on the second seat 34 against the second shoulder 36 with the moving blade 16 between the two. As illustrated in FIGS. 9-13, a right-handed embodiment is convenient for a right-handed person to use while standing to the left of the work material that they need to cut. A right-hand embodiment will easily cut curves to the right as shown in FIG. 13. If the left handed blades were installed (not shown), the fixed blade would be installed where the spacer is shown in FIG. 3, and the spacer would be installed where the fixed blade is currently shown. The blades would be to the left as viewed from the top and the tool would cut curves to the left.

First the details of the components used for assembly will be further described. After that, details of the individual blades that are relevant for cutting performance will be described.

Figure 4:
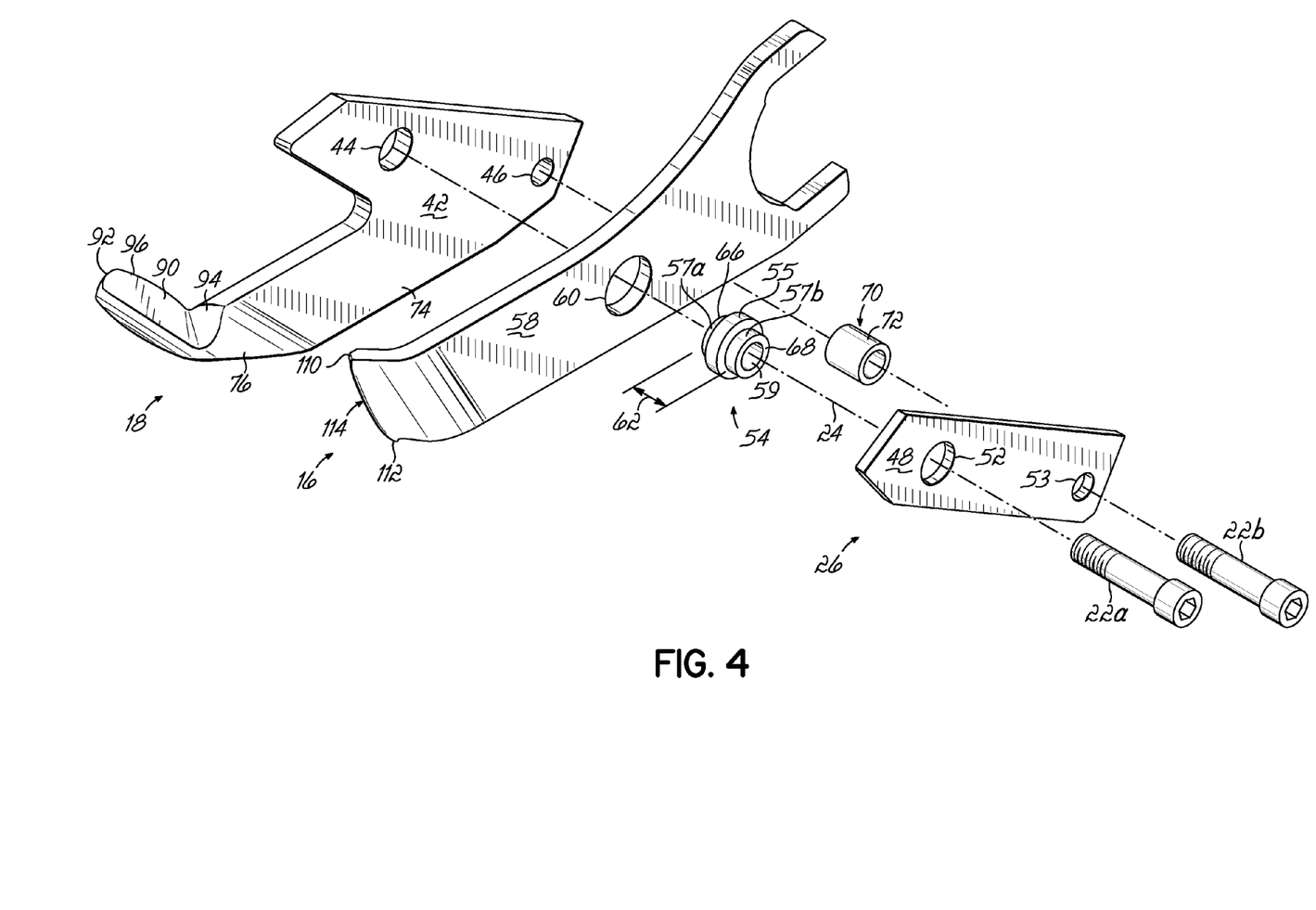
FIG. 4 is an exploded view of a portion of the embodiment of FIG. 1.
Figure 5:
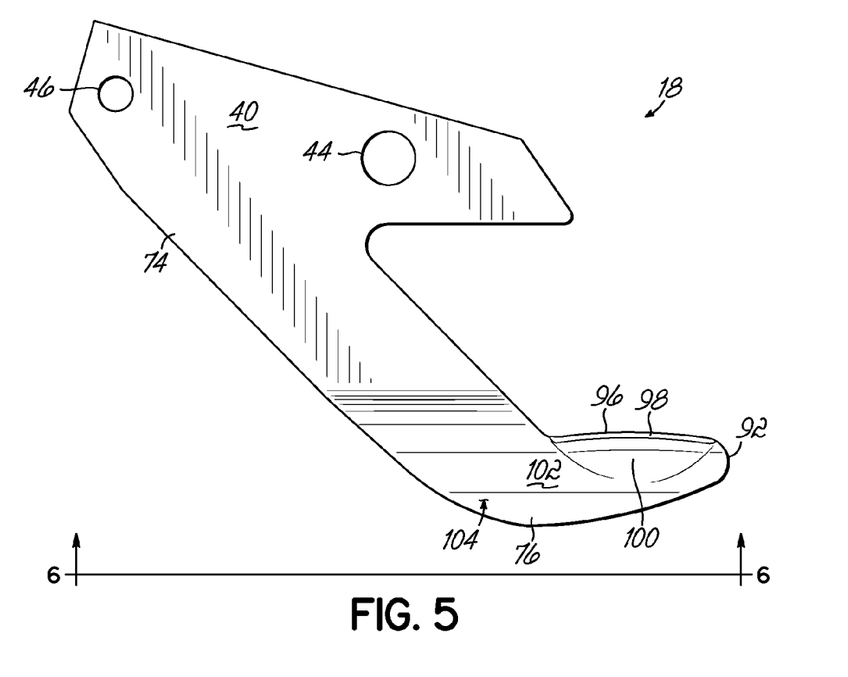
FIG. 5 is an elevational view of the stationary blade from the side opposite that shown in FIGS. 1 and 4.
Figure 6:
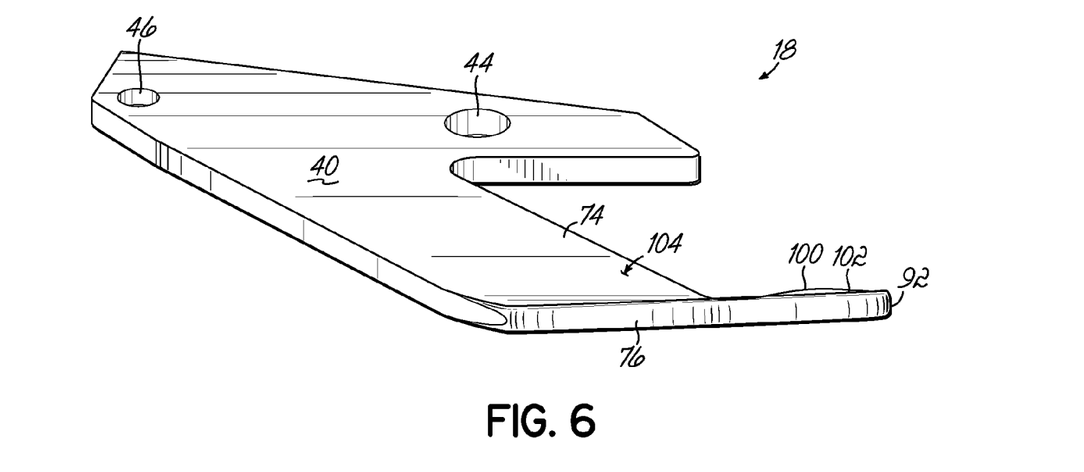
FIG. 6 is a perspective view as indicated in FIG. 5.

The exploded view FIG. 4 shows details of the assembly. The fixed blade 18 has an outer face 40 (FIG. 5), an inner face 42, a first hole 44, and a second hole 46. The first hole is larger than the second hole. The fixed spacer 26 also has an outer face 48, an inner face 50 (FIG. 3), a first hole 52, and a second hole 53. The first hole is again larger than the second hole. The movable blade 16 has a blade face 56 (FIG. 8C), a spacer face 58, and a pivot hole 60 that is larger in diameter than the first holes 44, 52. A bearing sleeve 54 has a major diameter 55, a minor diameter 57a, 57b, an inner diameter 59, and a length 62 from an end 66 to an end 68. The diameters 55, 57a, 57b have a sliding fit with the first holes and the pivot hole so that the moving blade may operate precisely with the fixed blade but be free to oscillate around the pivot axis 24. The bolt 22a passes through the housing 20, fixed spacer 26, bearing sleeve 54, movable blade 16, and fixed blade 18 and screws into a threaded insert (not shown) in the opposite side of the housing. The bolt 22b passes through the housing 20, fixed spacer 26, a spacer bushing 70, and the fixed blade 18, and screws into a threaded insert (not shown) in the opposite side of the housing 20. The spacer bushing 70 has an outside diameter 72 greater than the inside diameter of the second holes 46, 53, so the spacer bushing 70 does not enter the second holes 46, 53. The bolt 22c (FIG. 1) passes the through the housing 20 and screws into a threaded insert (not shown) in the opposite side of the housing 20. The bolt 22c does not pass through the blades 16, 18 or fixed spacer 26. The length 62 of the bearing sleeve 54 is less than the combined thicknesses of the blades 16, 18, and the fixed spacer 26. The length of the major diameter 55 is greater than the thickness of the movable blade 16 therefore the bearing sleeve 54 is squeezed by the inner face 42 and the inner face 50. This squeezing prevents the bearing sleeve 54 from rotating when the movable blade 16 oscillates.

The features of the blades 16 and 18 that make the cutting process convenient and durable will now be described and are best viewed in FIGS. 3-8C with occasional reference to other figures. Note that one of ordinary skill in the art may often use the term "radiused" as synonymous with "convex", as in a "radiused cutting edge" or "convexed cutting edge". However, that is not quite correct. Convex edges or surfaces may be more complex than a single radius, or be of a shape other than a radius. In this description and the claims that follow, the term "convex" is used for the broad scope of the invention. When being more specific for certain embodiments, the term "radius" will be used.

The fixed blade 18 has a leg 74 and a foot 76 at an angle $\alpha$ to the leg 74. The movable blade 16 has a leg 78 and a foot 80 at an angle $\beta$ to the leg 78. The angles $\alpha$ and $\beta$ are the same, and it has been found by experimentation that 45 (range 40-50) degrees is a preferred value. It is this angle $\alpha$, $\beta$ that places the feet of the blades 16 and 18 to the right of the legs 74, 78, when viewed from the top as in FIG. 3. The fixed blade 18 and movable blade 16 contact along a straight (when viewed from the top) contact plane 82 that is parallel to a center plane 84 of the portable shear 10, but offset from it. The contact plane 82 is offset from inner face 42 and blade face 56 by an offset 86. The offset 86 allows the movable leg 78 to move up and down relative to the fixed blade 18, without having to bend the cut metal 88 (FIG. 9) as much as it would if the contact plane 82 was not offset.

Figures 7, 7A:
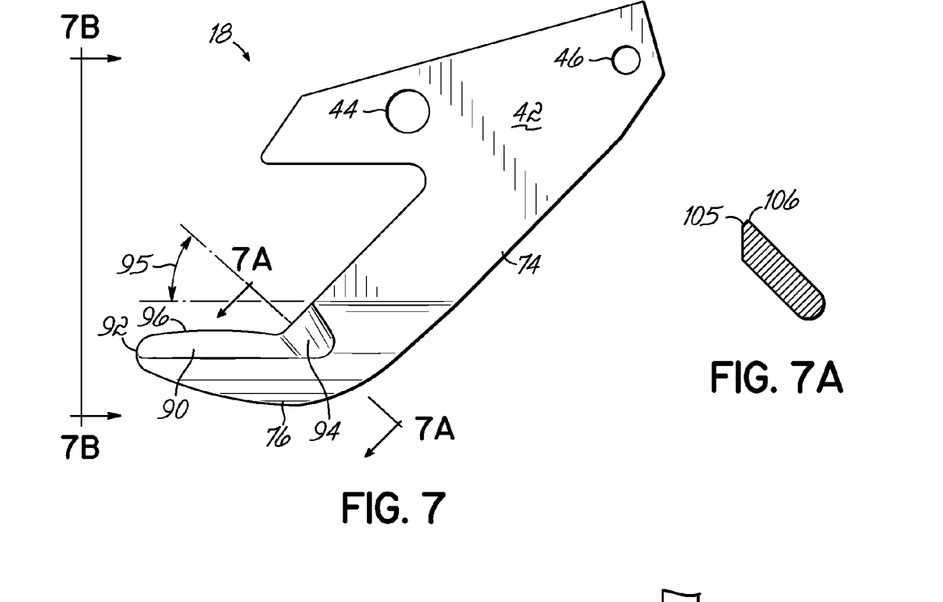
FIG. 7 is an elevational view of the stationary blade as seen in FIG. 4.
FIGS. 7A, and 7B are views as indicated in FIG. 7.
Figure 7B:
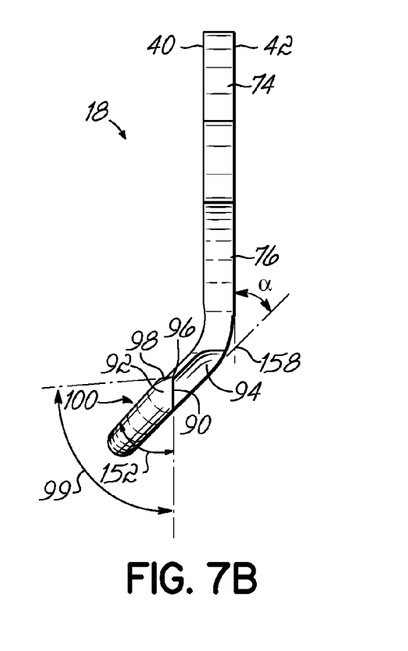
Figure 7C:
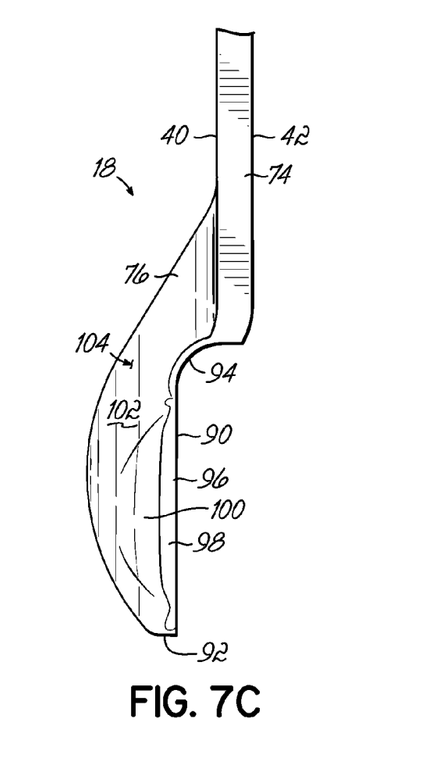
FIG. 7C is a partial view of the fixed blade as seen in FIG. 3.
Figure 7D:
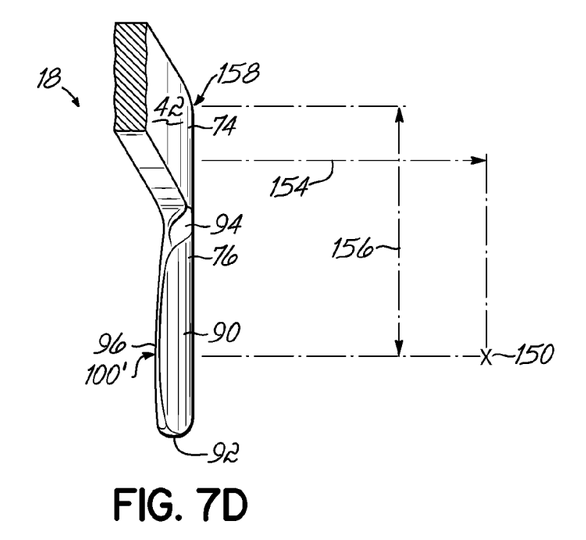
FIG. 7D is a rotated partial view of the fixed blade of FIGS. 7A, 7B, and 7C, and illustrates specifics of one embodiment.

The fixed blade 18 has a primary shearing surface 90 with a nose radius 92 at one end, a clearance radius 94 at the other end, and a convex cutting edge 96 at the contact plane 82. On the other side of the convex cutting edge 96 is a convex bevel 98 having a 3 (2.5-3.5 range) inch radius at an angle 99 to the primary shearing surface 90. We have found that an angle 99 of 82 (80-85 range) degrees works well. The convex cutting edge 96 continues into an un-ground (as-cast or fabricated) convex body feature 100 on a back surface 102 of the foot. The convex cutting edge 96 and the convex body feature 100 are particularly visible in FIGS. 5 and 6 respectively. It is the convex body feature 100, provided in the casting 104 of the fixed blade 18 that makes the current invention so durable and able to cut thicker metals. Without this bulge of material, the convex bevel 98 would not have a uniform width and surface area to distribute the cutting forces from the convex cutting edge 96 into the foot 76 of the fixed blade 18. In one embodiment (FIG. 7D) the convex body feature 100 is in the form of a cast material radius 100' at an angle 152 (FIG. 7B) located at a point 150 at a distance 154 and 156 from a reference point 158 (FIGS. 7B & 7D). Experimentation has shown that 100' of approximate 3 inches radius at an angle 152 of approximately 42 degrees, at distance 154 approximately equal to 2.76 inches and distance 156 approximately equal to 1.75 inches strengthens the convex cutting edge 96, thus allowing metals of greater thickness (lower gauge number) to be cut.

Besides having the strength to cut thicker metals than portable shearing equipment currently sold, the current invention also has the necessary clearance radius 94 to allow the remnant material to be pushed down by the moving blade 16, while the portable shear 10 is maneuvered as needed to follow corrugations or to make curved cuts. Experimentation has found that a clearance radius 94 of 0.250 inches (0.188-0.250 range) ground at an angle 95 equal to 56.5 (45-60 range) degrees, works, and does not create an excessively weakened condition, when used in combination with radius edges 105, 106 (FIG. 7A). The radius edges 105, 106 maintain enough thickness to distribute the stresses transmitted from the foot 76 to the leg 74. It has been found that a 0.025 (0.016-0.032 range) inch radius holds up well without significantly impacting the clearance provided by the clearance radius 94.

The nose radius 92 contributes to cutting a greater range of corrugations, and to cutting curves more easily through those corrugations. A $9/64^{th}$ (1/8-3/16 range) inch nose radius 92 allows the blades 16, 18 to travel inside the radii and pitches of corrugate material with precision, without becoming trapped at the changes of the slope of material. For the fixed blade 18, this takes place underneath the material (hidden lines, FIG. 9) and not in view of the operator.

Figure 8:
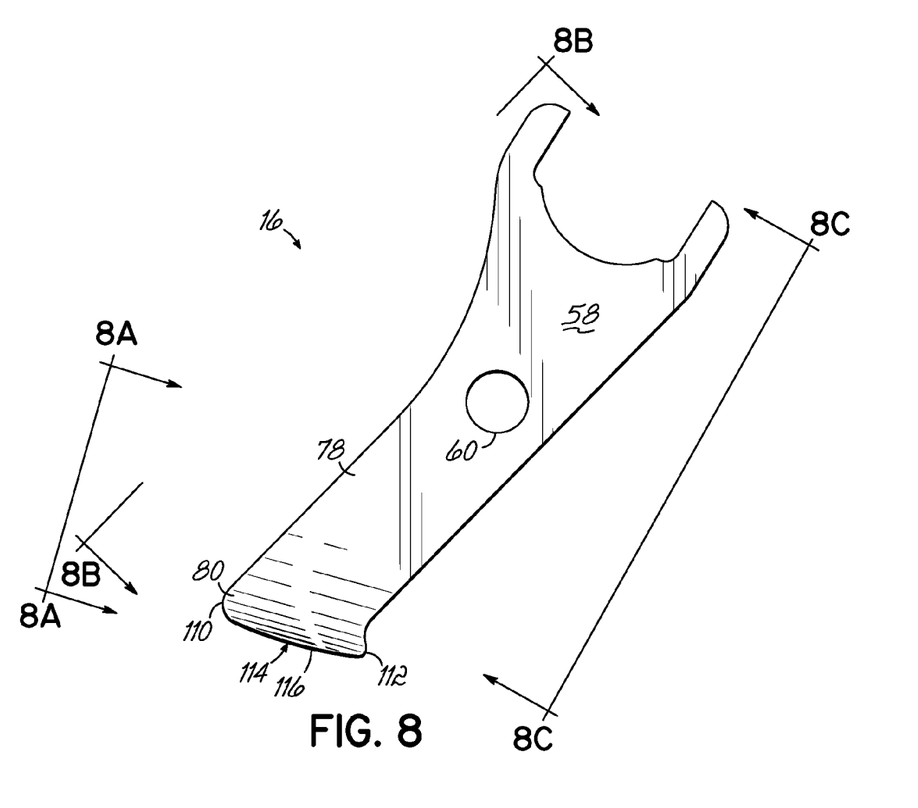
FIG. 8 is an elevational view of the moving blade of the embodiment of FIG. 1.
Figures 8A, 8B:
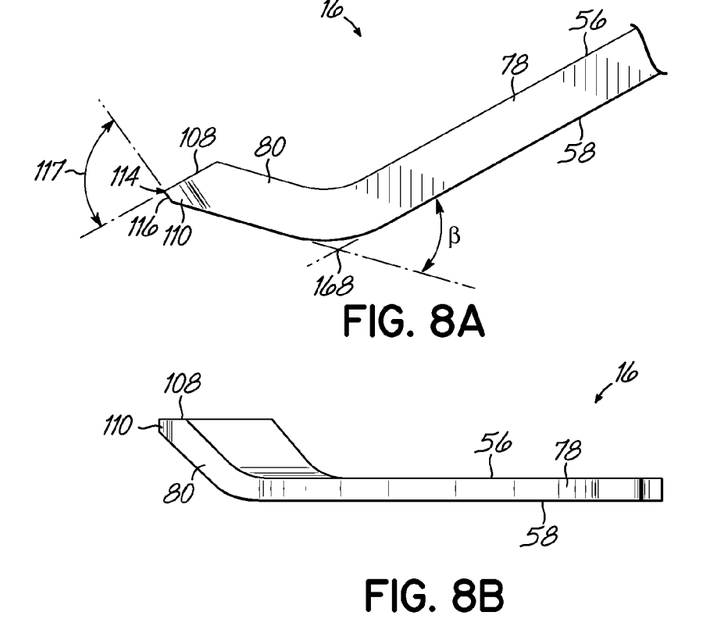
FIGS. 8A, 8B and 8C are views as indicated in FIG. 8.
Figure 8C:
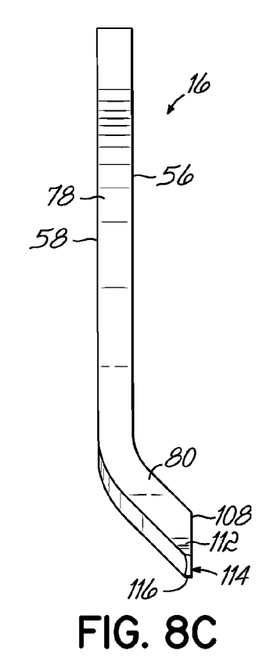
Figure 8D:
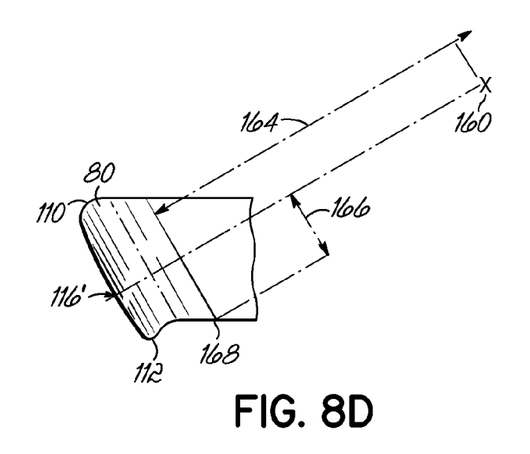
FIG. 8D is a rotated detail view of a portion of the blade in FIG. 8, and illustrates specifics of one embodiment.
Figure 9:
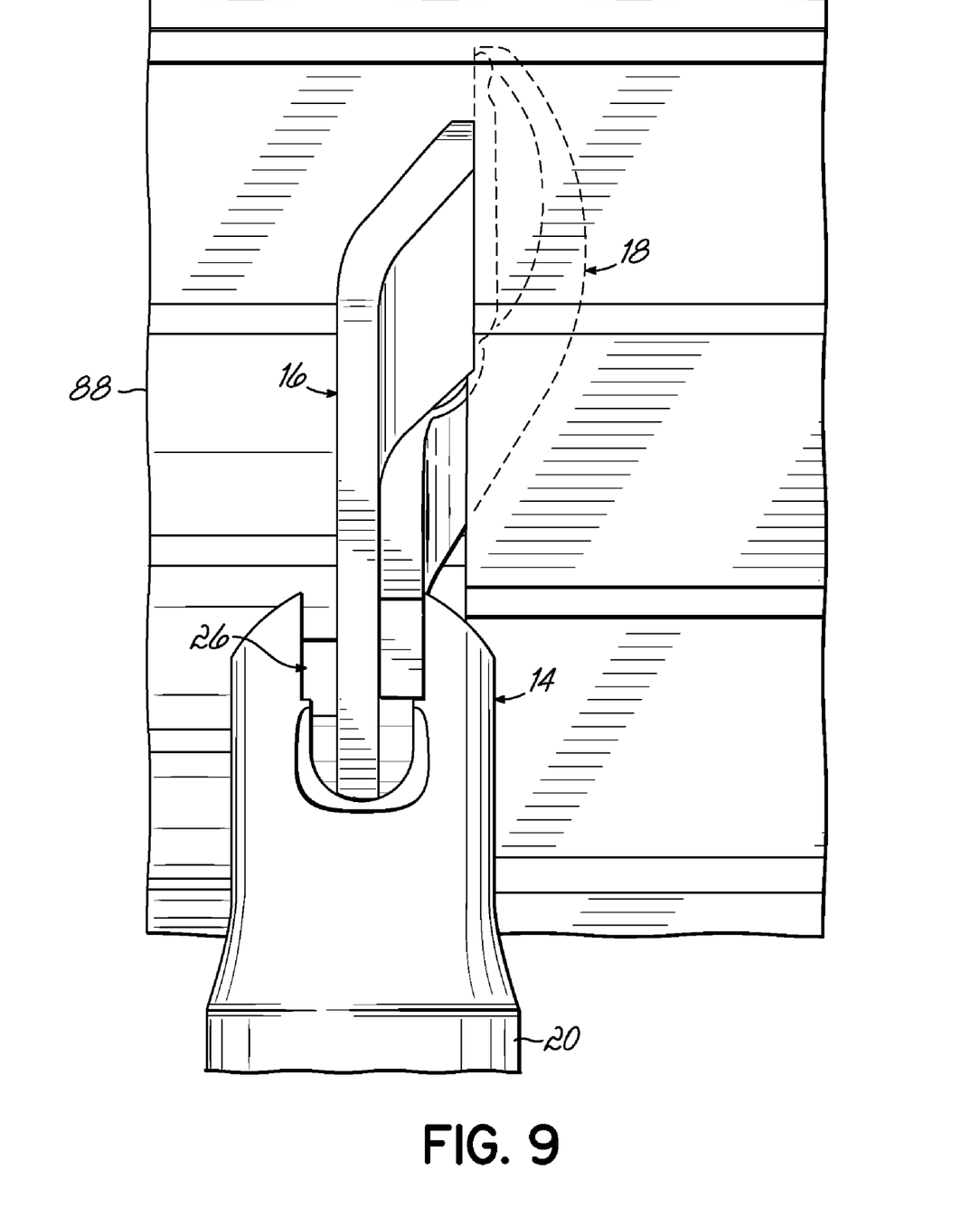
FIGS. 9, 10, 11, 12 and 13 are schematic views of a right-handed tool as in the embodiment of FIG. 1, cutting corrugated material.
Figure 10:
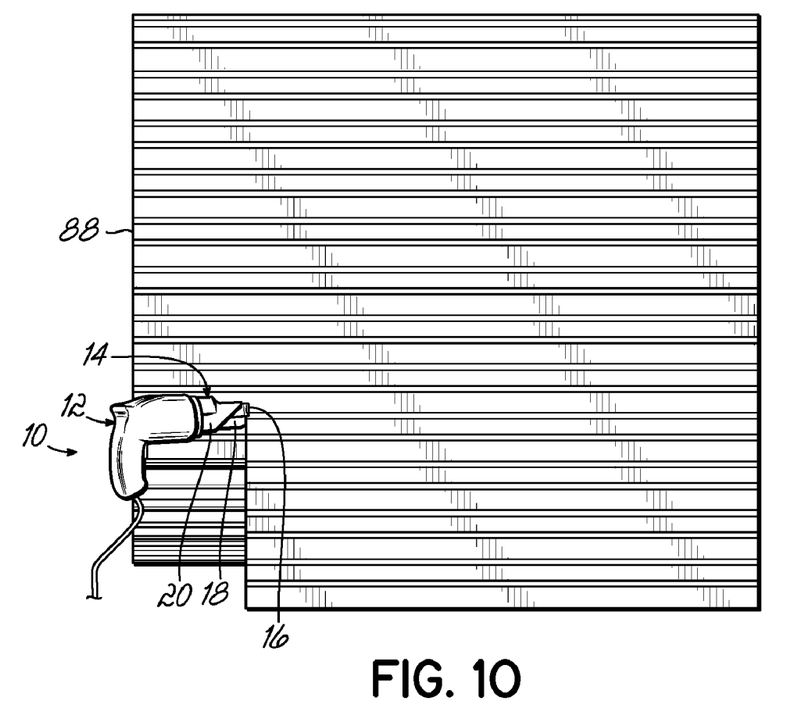
Figure 11:
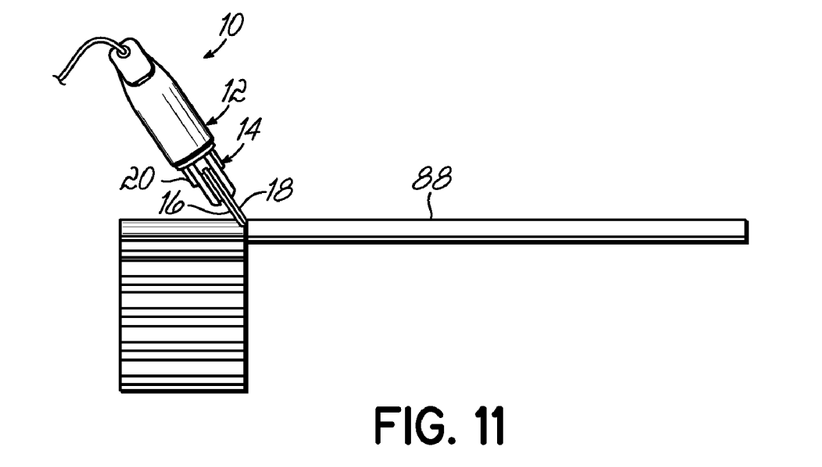
Figure 12:
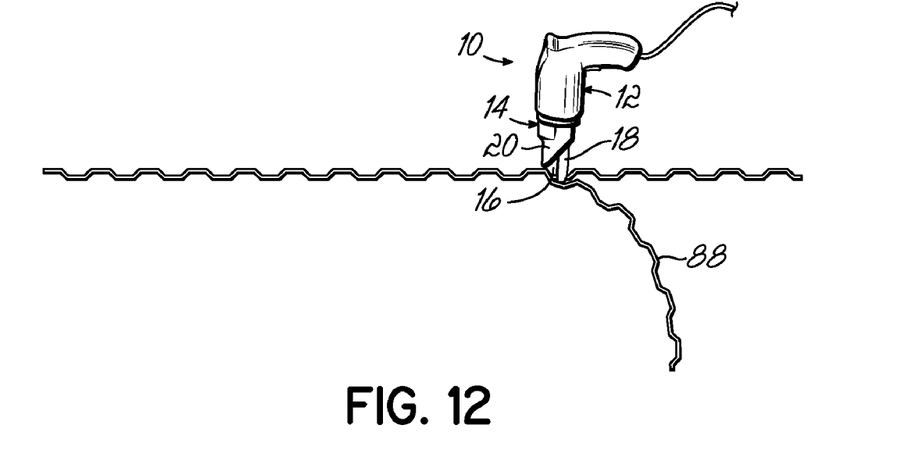

The movable blade 16 has a secondary shearing surface 108 with a nose radius 110 at one end and an extended heel 112 at the other. The secondary shearing surface ends at a convex cutting edge 114 having a 3 inch radius at the contact plane 82. On the other side of the convex cutting edge 114 is a ground convex bevel 116 at an angle 117 to the secondary shearing surface 108. In one embodiment (FIG. 8D) the ground convex bevel 116 is a radius 116' located at a point 160 that is a distance 164 and 166 from a reference point 168 (FIGS. 8A & 8D). Experimentation has shown that using radius 116' approximately equal to 3 inches at an angle 117 approximately equal to 82 (80-85 range) degrees works well at distance 154 approximately equaling 2.48 inches and 156 approximately equaling 0.54 inches. The approximate values given for the size of 100' and 116' and the distances 154, 156, 164, 166 and the angles 117 and 152 work in cooperation in one embodiment of right hand set 38.

The nose radius 110 is $9/64^{th}$ (1/8-3/16 range) inch and works in the same way as the nose radius 92 does, but it is visible to the operator. The extended heel 112 provides an extension of the secondary shearing surface 108 for easy assembly and for blade-to-blade contact during operation to prevent the movable blade 16 from trying to run on the wrong side of contact plane 82. One of ordinary skill in the art may consider it normal practice for a cutting tool to maintain contact of the primary shearing surface 90 with the secondary shearing surface 108, however the improved clearance radius 94 on the fixed blade 18 causes engagement to be lost at the end of the movable blade stroke. The solution to this problem is the extended heel 112 that maintains contact but does not interfere with the clearance radius 94.

In keeping with the emphasis of this invention, which is to successfully cut a range of tough corrugated metal panels, the length has been made sufficient to cut up to 4 inch deep corrugated materials. This length is understood as a distance 118 (FIG. 1) from the pivot axis 24 to the intersection of the convex cutting edge 96 with the convex cutting edge 114. Related to this, specifically on the movable blade 16, is the length from the pivot axis 24 to the 45 degree angle that demarcates the feet 76, 80. Also related, on the fixed blade, is the length from the pivot axis 24 to the center of the clearance radius 94. It was important to make distance 118 long enough to keep the cut-zone visibly in front of the housing 20 so the cut zone can be seen by the operator, and also long enough so that when the blade 18 is being buried in the valleys of the corrugations, there is still enough reach to keep the shearing surfaces 90, 108 in un-cut metal.

While the foregoing description has set forth preferred embodiments of the present invention in particular detail, it must be understood that numerous modifications, substitutions and changes can be undertaken without departing from the true spirit and scope of the present invention as defined by the ensuing claims. The invention is therefore not limited to specific embodiments as described but is only limited as defined by the following claims.

What is claimed is:

1. A power driven portable head for a sheet metal cutter comprising:
   a housing having a longitudinal slot, a first seat ending in a first shoulder and a second seat ending in a second shoulder;
   a set of blades including a fixed blade, a movable blade and a spacer,
   the spacer having a first hole and a second hole, the first hole having a larger diameter than the second hole;
   the fixed blade having a first hole and a second hole, the first hole having a larger diameter than the second hole, a leg and a foot extending at a fixed angle to the leg;
   the movable blade having a pivot hole having a larger diameter than the diameter of the first hole of the fixed blade and the first hole of the spacer, a leg and a foot extending at the same fixed angle to the leg as in the fixed blade;
   a bearing sleeve having a length less than a combined thickness of the set of blades, a first portion of the bearing sleeve having a major diameter adapted to slidably fit in the pivot hole of the movable blade, a portion on one side of the first portion of the bearing sleeve having a minor diameter less than the major diameter adapted to slidably fit in the first hole of one of the fixed blade and spacer and a portion on the opposite side of the first portion of the bearing sleeve having a minor diameter less than the major diameter adapted to slidably fit in the first hole of one of the fixed blade and spacer, the bearing sleeve having an inner diameter;
   a first bolt passing through a first portion of the housing, the first hole of the fixed blade, the inner diameter of the bearing sleeve and the first hole of the spacer and being secured to a second portion of the housing opposite the longitudinal slot;
   a spacer bushing having an outside diameter greater than the inside diameter of the second hole of the fixed blade and second hole of the spacer so the spacer bushing does not enter the second hole of the fixed blade and does not enter the second hole of the spacer;
   a second bolt passing through a portion of the housing, the second hole of the spacer, the spacer bushing, the second hole of the fixed blade and being secured to another portion of the housing;
   wherein the fixed blade mates against one of the shoulders of the housing and the fixed spacer mates against the other of the shoulders of the housing, the movable blade being between the spacer and the fixed blade and being mounted to oscillate about a pivot axis during operation of the head; and
   a third bolt passing from one portion of the housing to another portion without passing through the blades or spacer.

2. The power driven portable head of claim 1 wherein the bearing sleeve does not rotate.

3. The power driven portable head of claim 1 wherein the sheet metal cutter has a center plane, the fixed and movable blades contacting each other along a contact plane parallel the center plane but offset from the center plane.

4. The power driven portable head of claim 1 wherein the fixed blade has a primary shearing surface with a nose radius at one end and a clearance radius on the other end.

5. The power driven portable head of claim 1 wherein the fixed blade has a convex cutting edge.

6. The power driven portable head of claim 1 wherein the movable blade has a secondary shearing surface with a nose radius at one end and an extended heel on the other end.

7. The power driven portable head of claim 4 wherein the movable blade has a secondary shearing surface with a nose radius at one end and an extended heel on the other end.

8. A power driven portable head for a sheet metal cutter comprising:
- a housing having a longitudinal slot, a first seat ending in a first shoulder and a second seat ending in a second shoulder;
- a set of blades including a fixed blade, a movable blade and a spacer,
- the spacer having a first hole and a second hole, the first hole having a larger diameter than the second hole;
- the fixed blade having a first hole and a second hole, the first hole having a larger diameter than the second hole, a leg and a foot extending at a fixed angle to the leg;
- the movable blade having a pivot hole having a larger diameter than the diameter of the first hole of the fixed blade and the first hole of the spacer, a leg and a foot extending at the same fixed angle to the leg as in the fixed blade;
- a bearing sleeve having a length less than a combined thickness of the set of blades, a first portion of the bearing sleeve having a major diameter adapted to slidably fit in the pivot hole of the movable blade, a portion on one side of the first portion of the bearing sleeve having a minor diameter less than the major diameter adapted to slidably fit in the first hole of one of the fixed blade and spacer and a portion on the opposite side of the first portion of the bearing sleeve having a minor diameter less than the major diameter adapted to slidably fit in the first hole of one of the fixed blade and spacer;
- a first fastener passing through a first portion of the housing, the first hole of the fixed blade, an inner diameter of the bearing sleeve and the first hole of the spacer and being secured to a second portion of the housing opposite the longitudinal slot;
- a spacer bushing having an outside diameter greater than the inside diameter of the second hole of the fixed blade and second hole of the spacer so the spacer bushing does not enter the second hole of the fixed blade and does not enter the second hole of the spacer;
- a second fastener passing through a portion of the housing, the second hole of the spacer, the spacer bushing, the second hole of the fixed blade and being secured to another portion of the housing;
- wherein the fixed blade mates against one of the shoulders of the housing and the fixed spacer mates against the other of the shoulders of the housing, the movable blade being between the spacer and the fixed blade and being mounted to oscillate about a pivot axis during operation of the head.

9. The power driven portable head of claim 8 further comprising a third fastener passing from one portion of the housing to another portion without passing through the blades or spacer.

10. The power driven portable head of claim 8 wherein the sheet metal cutter has a center plane, the fixed and movable blades contacting each other along a contact plane parallel the center plane but offset from the center plane.

11. The power driven portable head of claim 8 wherein the fixed blade has a primary shearing surface with a nose radius at one end and a clearance radius on the other end.

12. The power driven portable head of claim 8 wherein the fixed blade has a convex cutting edge.

13. The power driven portable head of claim 8 wherein the movable blade has a secondary shearing surface with a nose radius at one end and an extended heel on the other end.

14. The power driven portable head of claim 11 wherein the movable blade has a secondary shearing surface with a nose radius at one end and an extended heel on the other end.

* * * * *